United States Patent [19]

Williamson

[11] Patent Number: 4,534,630

[45] Date of Patent: Aug. 13, 1985

[54] WIDE FILM TRANSPORT AND REGISTER MOVEMENT

[75] Inventor: Geoffry H. Williamson, Los Angeles, Calif.

[73] Assignee: Imax Systems Corporation, Toronto, Canada

[21] Appl. No.: 575,446

[22] Filed: Jan. 31, 1984

[51] Int. Cl.³ .............................................. G03B 1/22
[52] U.S. Cl. ..................................... 352/194; 226/62
[58] Field of Search ............... 352/191, 194, 195, 196; 226/62

[56] References Cited

U.S. PATENT DOCUMENTS 2,104,948  1/1938  Laube et al. ...................... 352/191
3,587,960  6/1971  Gerb ................................. 352/194

Primary Examiner—Monroe H. Hayes
Attorney, Agent, or Firm—William H. Maxwell

[57] ABSTRACT

A transport and register movement for motion picture cameras and projectors and having spaced transport arms with cam operated claw pins and a crank shaft and transmission between the arms to oscillate the same and with a laterally offset drive shaft and cam operated register pins and a crank pin oscillating a counterbalance in opposition to motion of the arms.

24 Claims, 15 Drawing Figures

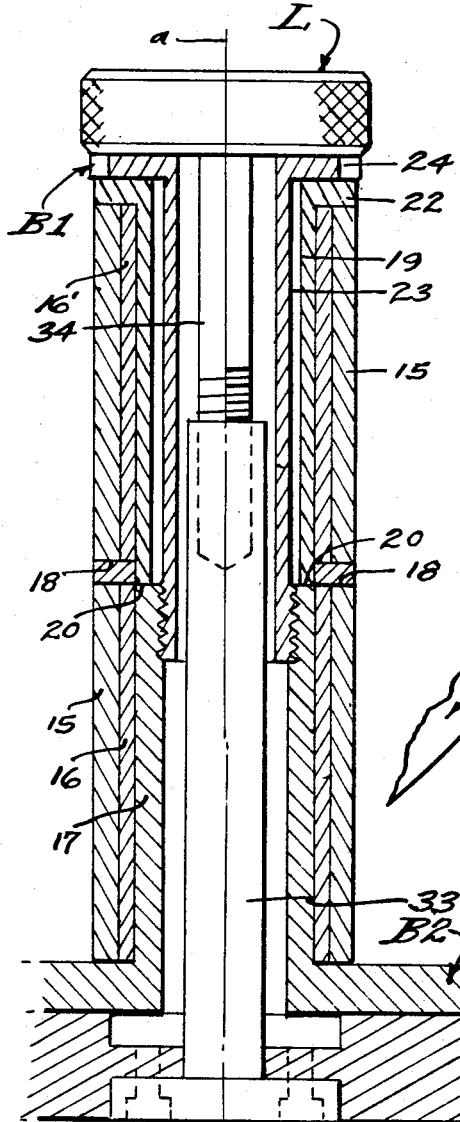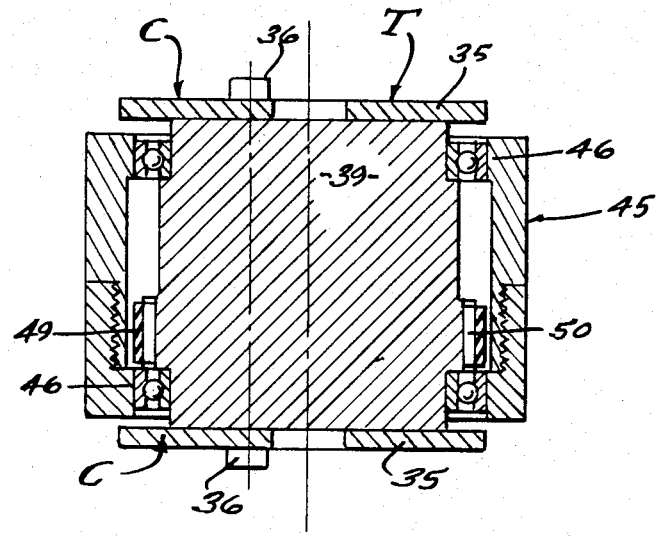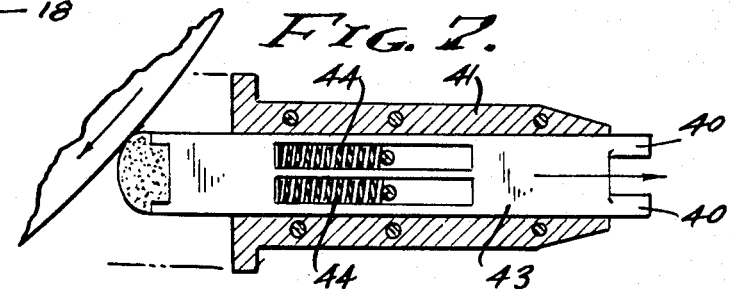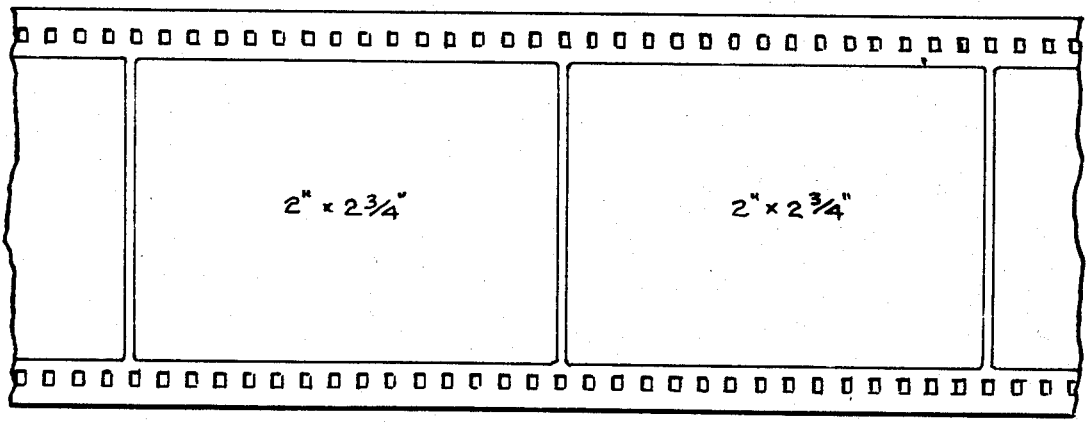

WIDE FILM TRANSPORT AND REGISTER MOVEMENT

BACKGROUND

This invention relates to motion pictures and to the film transport movement therefor in cameras and projectors, and particularly in cameras using wide 65 mm film as it is distinguished from 35 mm film. Heretofore, the Fox camera movements have been characterized by a single film transport claw engageable with perforations along one side of the film, and by register pins engageable with perforations along the other or both sides of the film. Although the single claw camera movements have been satisfactory in the transport of 35 mm film, difficulties arise in single claw camera and projector movements used in the transport of 65-70 mm film. The wide film is not as stable due to its thickness to width ratio, its greater width and transport dimensions giving rise to problems in claw engagement and registration, and its double size proportionately multiplies problems with respect to the physical properties of the film per se; for example the strength, and any deformations thereof. It is commercially available film with which this invention is primarily concerned, and especially wide 65-70 mm motion picture film with perforated drive margins in a body of acetate or Mylar having 0.003 to 0.006 inch thickness, and carrying an 0.0008 inch thick photographic emulsion on the forward side thereof.

This invention is an improvement over the "Fox" camera movement that has been successfully used to intermittently pull down and register film for the exposure of successive frames or pictures. This type of movement is characterized by a cam incorporated in a driven crank member that oscillates an arm. The arm swings on a pivot so that its radius strikes an arc coincidental with an arcuate film guideway, and the end of the arm carries a retractile claw shifted radially into and out of engagement with the perforations along one side of the film by said cam. A second cam shifts register pins into and out of anchored engagement with the perforations at the other or both sides of the film. Characteristically, the two cams are spaced on the single crank member, one cam in alignment with the perforations along one side of the film, and the other cam centered with respect to the film plane and disposed between the crank member and bearing support therefor. These positions and relationships are well established and dictated by the length of the claw arm that overlies its cam, by the locations of the register pin mechanism, and by other quite necessary features including claw adjustment and retraction of the registration pins. It is to be understood that this type of camera movement is made with precision in order to have reliability and smoothness of operation, and to this end the oscillating parts are light weight as compared to the heavy supporting mass that has been necessary in the surrounding frame or base. In this latter respect, difficulties have existed in balance, and vibration has always been a problem.

Convention has dictated top to bottom or "pull down" transport of motion picture film, and consequently the horizontal picture format extends transversely of the film. With the advent of larger projection screens and wide angle showing of motion pictures, the resolution afforded by 35 mm film is lacking and resort has been made to the larger format available with 65-70 mm film. It will be readily seen that 65-70 mm film produces four times the format area when projected in the vertically disposed "pulldown" mode, and that it will produce eight times the format area if projected in a horizontally disposed "pull-across" mode. For example, the horizontal transport of film as it is shown herein has a frame format of approximately 2 inches by 2.75 inches. Accordingly, the size of the camera movement as it is disclosed herein is proportionately larger than the conventional 35 mm mechanism, and it requires 2.799 inches of claw movement and registration of a commensurate length of film per frame; an increase from four to fifteen perforations. It is a general object of this invention to provide a practical film transport movement for cameras and projectors, by which wider films can be successfully advanced and registered frame by frame, while meeting all requirements of access, adjustment, accuracy and reliability.

This film transport movement employs the Fox principle of an oscillating transport arm carrying a retractile claw controlled by a cam, it being an object of this invention to provide this principle to engage both sides of the perforated film and thereby balance the driving forces applied during transport. With the present invention there is a transport arm and retractile claw controlled by a cam at each side of the film, and a transmission therewteen. In practice, there is a transmission housing that exposes the two cams in alignement with the two opposite rows of film perforations to be engaged by the claws associated therewith. The transmission housing accommodates a pulley driven crank shaft rotatably carried therein on anti friction bearings.

With the transmission intermediate the transport arms as above described, there is a wide separation of the top and bottom cams and of the top and bottom transport arms complementary thereto. It is an object of this invention to provide for locked adjusted alignment of these two transport arms so as to ensure that they move together with driving engagement from separate crank pins on a common axis eccentric from the common cam rotation axis. It is also an object of this invention to provide for locked pitch adjustment of these two transport arms in said locked alignment, allowing for film shrinkage and so as to ensure proper claw position with respect to the frame aperture. These two adjustment and locking features are incorporated in a shiftable pivot post and cam positioned carriage therefor. The pivot post is comprised of separable and concentric members with separate lock screws for the alignment and the pitch adjustment functions.

The pivot post, transport arm and crank drive therefor are offset downward and/or to one side in the direction of film transport; down and/or to one side of the film exposure aperture. Consequently, the space behind the aperture plate is open for light transmission in projectors, and for accomodating mechanism in a camera as herein disclosed. It is an object of this invention to reserve this space rearward of the aperture plate for either of said uses, while providing an offset drive to the aforesaid transmission with simultaneous timed extension and retraction of register pins. In practice, the offset drive is spaced rearward from the aperture plate and the register pins are located along the bottom margin of the film to engage the perforations therealong. It is an object of this invention to engage register pins at both the front and back of each film frame when it is being exposed, thereby ensuring a positive longitudinal and vertical location of the film, flatness being maintained by a vacuum back plate behind the film.

Retraction of both the transport claw pins and register pins is quite necessary for loading and unloading the film; that is, insertion into and removal of film from the guideway. Also, secure tranport engagement of the claw pins and of the register pins is exceedingly important with this large film format, and accordingly it is an object of this invention to double or more than double the shear strength of said claw pins and register pins. With the present invention, compared to the Fox movement, the shear strength of the transport claw pins is four times greater than a single claw pin, there being two pairs of claw pins; and the shear strength of the register pins is two times greater than a pair of pins engaging opposite perforation. It is significant that the present invention provides longitudinal spaced pairs of pins between which the exposed film section is extended in flat condition for registration. Normally, either the claw pins or the register pins are projected to engage the film perforations, and retraction of the register pins is provided for when the claw pins are also retracted through rotative positioning of the movement.

Shutter speed is a controlling factor in motion picture taking, and the present standard of 24 to 48 frames per second involves synchronously timed rotary and oscillatory and reciprocating motions of various means. Due to the increased size of this transport and register movement for the larger 65-70 mm film, vibration is a factor to be considered. Accordingly, it is an object of this invention to counterbalance the motion of oscillatng and reciprocating members, with counter motion of other members. As will be described, a counterbalance arm and weight is disposed between and oscillates in opposition to the motion of the transport arms. A rotary drive helps to counterbalance the reciprocating motion of the register pins. And, all rotary members are counter balanced for smoothness and quiet operation.

SUMMARY OF THE INVENTION

The film transport and register movement of this invention has all of the features of the prior art Fox movement, and in addition thereto ensures the feasability of transporting and registering much larger film having at least four and as much as eight times the aperture area. Single claw and double register pins are grossly inadequate for handling 65-70 mm film, and the asymetry of a single claw movement has proven inadequate. Unobviousness resides in the transmission-transport claw relationship and the offset drive therefor as it is disclosed herein, and in the adjustably locked alignment of widely spaced transport arms carrying the retractile claw pins engageable with perforations at both sides of the film. Locked pitch adjustment is no longer a shop or laboratory operation, and is disclosed herein as a simple camera adjustment compensating for film shrinkage. Spaced registration pins are disclosed herein whereby film extended across the aperture is held longitudinally and vertically located in a planar condition. Space is reserved behind the aperture plate for light projection in projectors, and herein for counterbalancing the oscillatory motion of the transport arms. Register pins are retracted as and when required, and the film guideway is in no way impaired. With the features provided as disclosed herein, precise registration and transport of wide 65-70 mm film is accomplished without any excessive wear or damage to the film.

The foregoing and various other objects and features of this invention will be apparent and fully understood from the following detailed description of the typical preferred form and application thereof, throughout which description reference is made to the accompanying drawings.

DESCRIPTION OF THE DRAWINGS

FIG. 5 is an enlarged detailed sectional view of the alignment and pitch adjustment means taken as indicated by line 5—5 in FIG. 3.

FIG. 6 is a sectional view of the transmission means taken as indicated by line 6—6 in FIG. 2.

FIG. 7 is an enlarged detailed fragmentary view taken as indicated by line 7—7 in FIG. 3.

FIG. 8 is an elevation of the film and format transported and registered herein.

Figure 14:
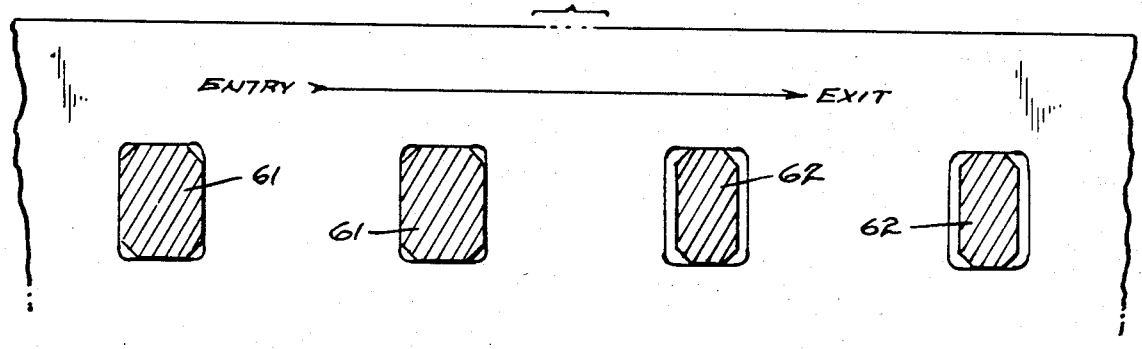
Figure 15:
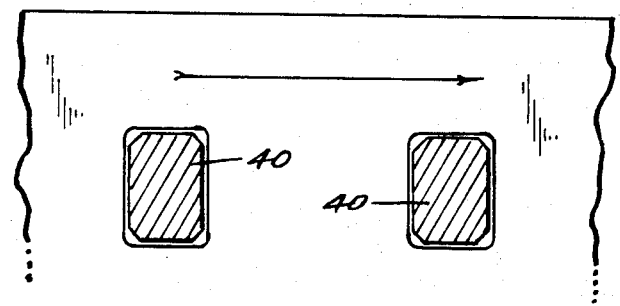

And, FIGS. 14 and 15 are enlarged fragmentary views of the film perforations as they are penetrated by the register and claw pins, FIG. 14 showing full engagement of the register pins at the entry side of the picture format and longitudinal clearance at the exit side of the picture format, and FIG. 15 showing slight all around clearance of the claw pins.

PREFERRED EMBODIMENT

Referring now to the drawings, there is a flat horizontally disposed base F of considerable mass to which the cooperative means of the present invention are mounted as a film transport and register movement. Film is usually drawn downward from a supply reel, through the camera or projector movement, and onto a take-up reel, in which case the film advancement is referred to as "pull-down". However, with the present invention the film is drawn from one side to the other through the movement, in which case the film advancement is "pull-across". It is this horizontal film transport which has advantages in optical resolution by increasing the picture format area as much as eight-fold. A camera movement will be disclosed herein as it is disposed horizontally for lateral transport. However, it is to be understood that a conventioanl vertical "pull-down" disposition can be employed. Accordingly, the base F is a horizontally disposed element as shown herein.

This transport and register movement involves generally, film guide means G, transport means A comprised of spaced transport arms 14 carrying claw pins engageable into marginal perforations of the film to advance the same, transmission means T between the transport arms and revolving a crank shaft to oscillate the arms, cam means C at opposte ends of the crank shaft to extend the retractile claws, alignment means B1 to align the spaced transport arms, pitch adjustment means B2 to locate a pivot for the spaced transport arms, lock means L for means B1 and B2, an offset drive means D for rotating the transmission means T, register means R comprised of a carriage carrying registration pins penetrating marginal perforations of the film to alternately arrest the film for exposure and release the film for transport, register retracting means H to withdraw means R from the film, and counterbalance means E to oppose the oscillatory motion of the transport arms 14. The structural elements and means will now be cooperatively described.

The film guide means G is of the usual form and configuration, with the exception of the features therein necessary to cooperate with both the upper and lower transport arms and retractile claw pins projected therefrom, and also to cooperate with the spaced register pins, as later described. The guide means G is comprised of a film guideway formed of two transverse upstanding vertically disposed plates 11 and 11' supported by the base F. Film transport will be shown and described as right to left, in which case the guide means G includes an aperture section and a transport section. As shown, the aperture section is flat for planar support of the film over a horizontally disposed rectangular aperture 10, and the flat portion of the register plate 11 with a planar back-up for the film in the camera version not shown. The transport section continues tangentially from the side of the aperture section and is characteristically arcuate in plan configuration as it is formed about a vertical axis a spaced rearward from the register plate 11 and about which said arcuate section is concentric. The arcuate transport section of the register plate 11 is slotted at 12 and 13 to receive the end portions of upper and lower transport arms 14 with the distal ends thereof substantially flush with the outside peripheral curve of the register plate 11. The aperture plate 11' coextensively the register plate 11, with uniform space therebetween to form the film guideway, with the aperture 10 formed therethrough as shown. The guideway is of vertical width to receive 65–70 mm film, and the aperture is 2 inch by $2\frac{3}{4}$ inch. Fifteen aligned perforations in the top and bottom margins of the film constitute the $2\frac{3}{4}$ dimension of transport with a small space between successive frames, as shown. Camera film is 65 mm wide, whereas projector film printed therefrom and with a sound strip is 75 mm wide.

Figure 1:
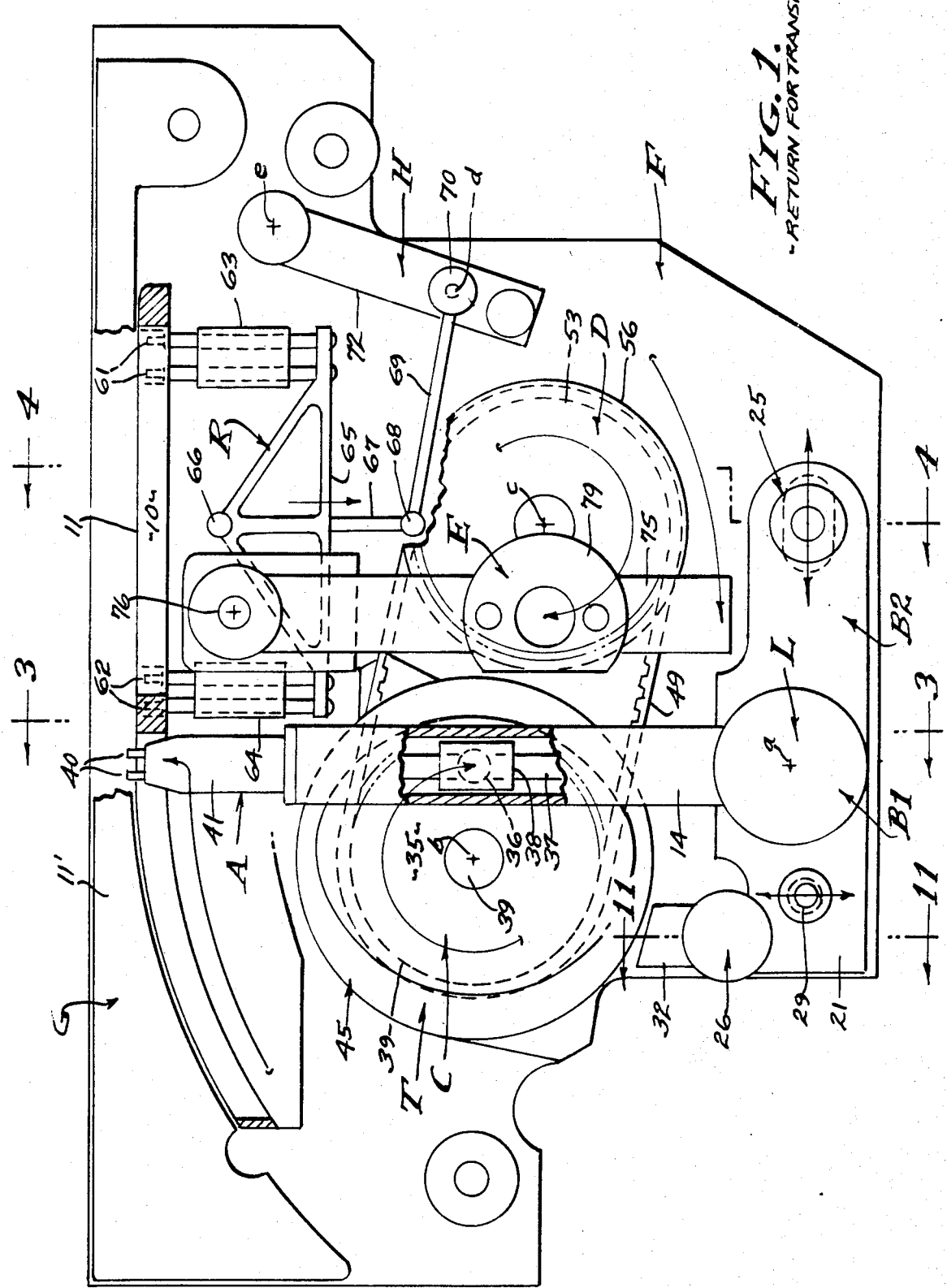
FIG. 1 is a plan view of the Wide Film Transport and Register Movement shown in a claw engaged position for transport.
Figure 2:
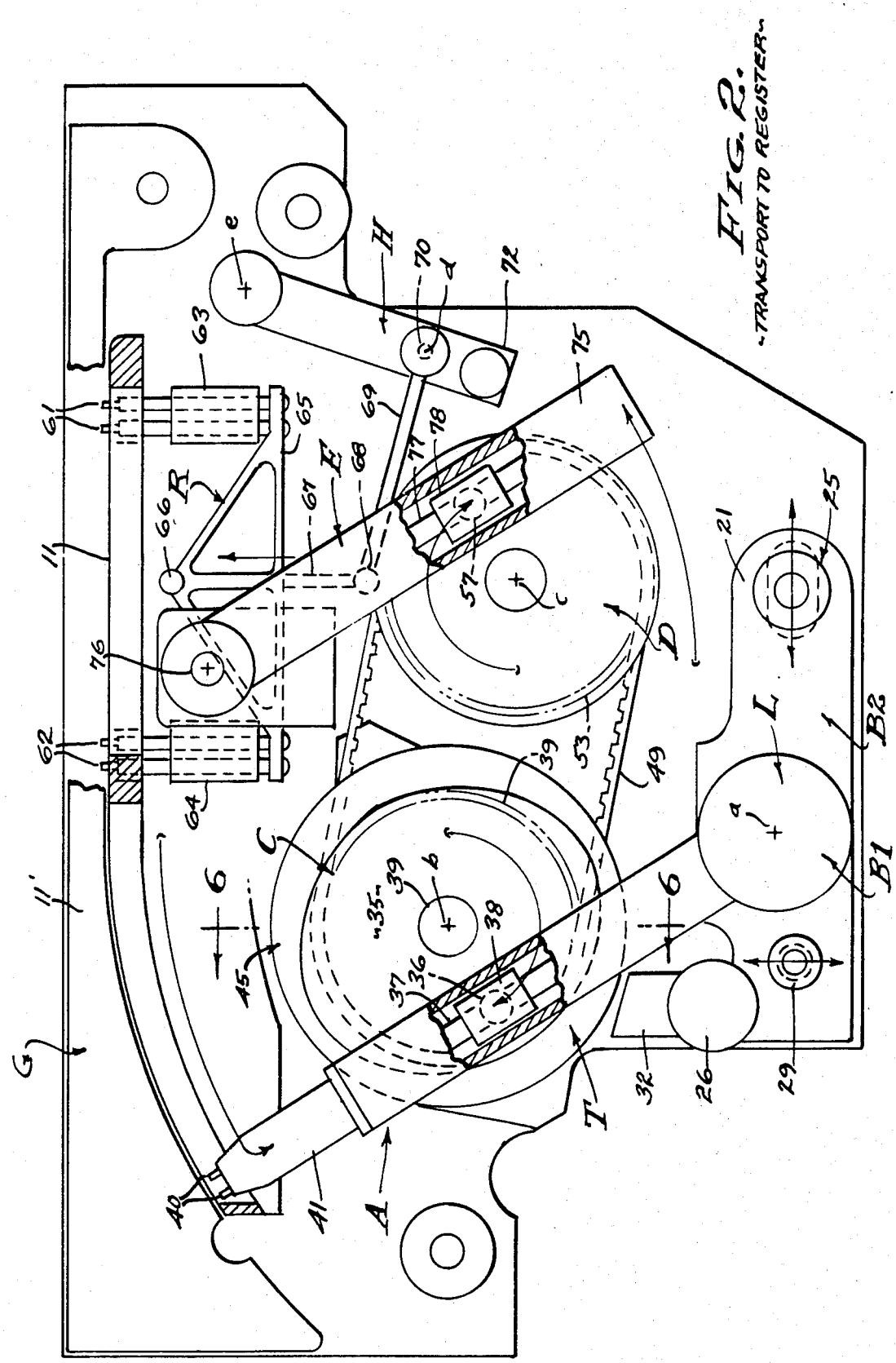
FIG. 2 is a plan view of the movement shown in a registered position for film exposure.
Figure 3:
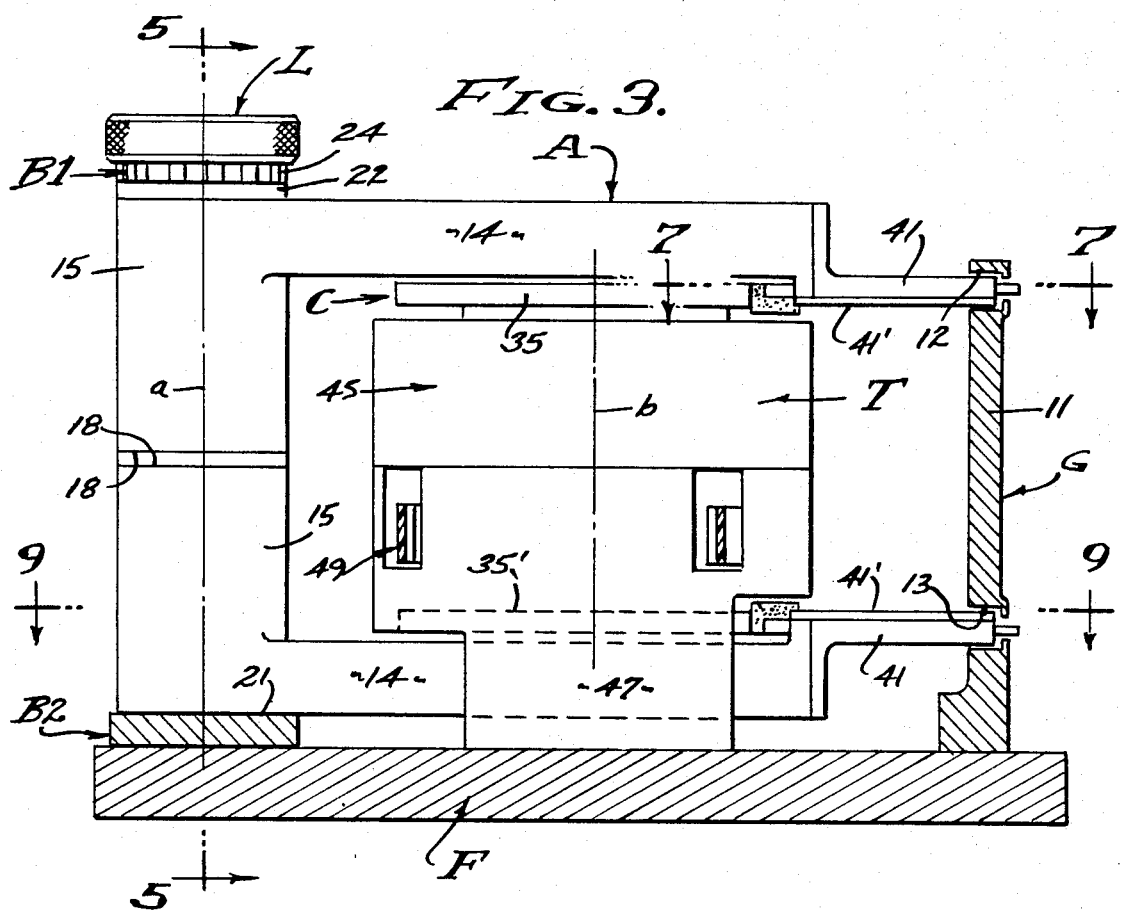
FIGS. 3 and 4 are sectional views of the transport and register means and taken substantially as indicated by lines 3—3 and lines 4—4 in FIG. 1.
Figure 4:
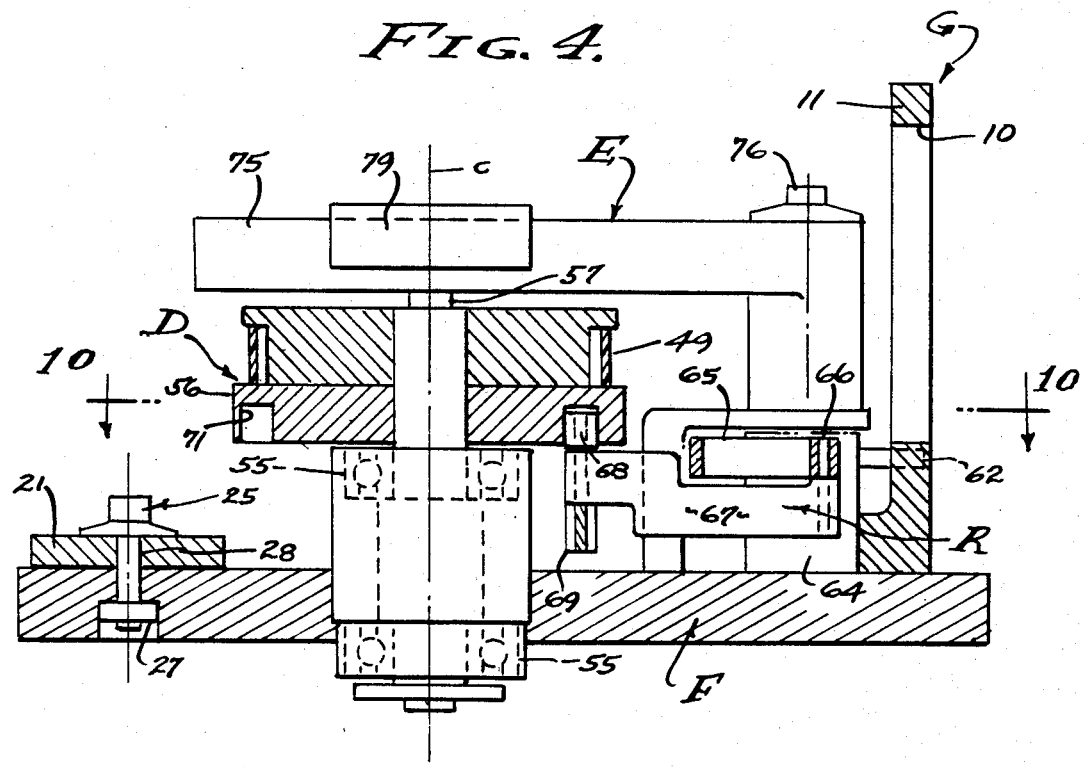
Figure 9:
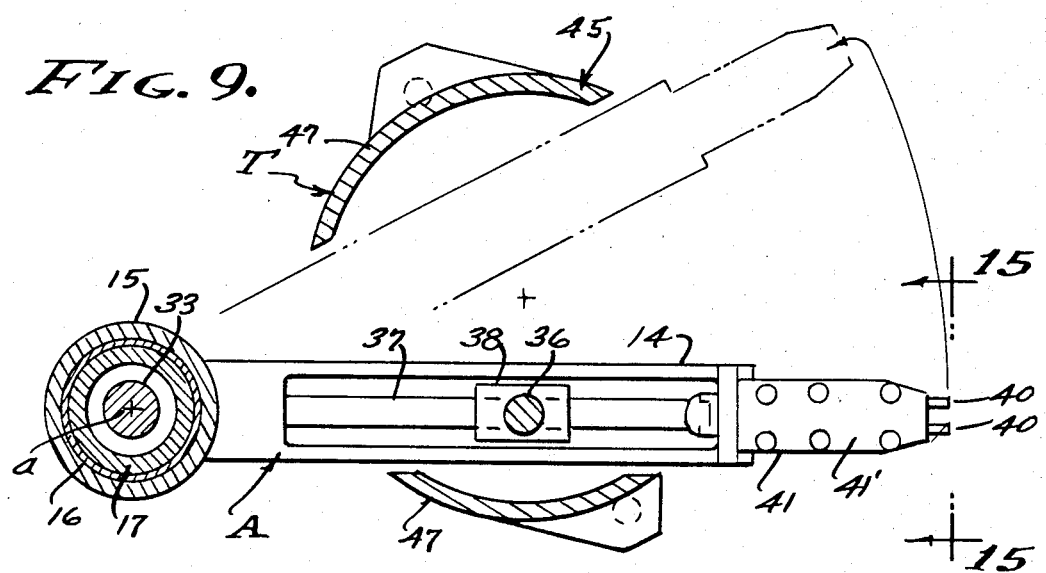
FIG. 9 is a plan section taken as indicated by line 9—9 in FIG. 3.
Figure 10:
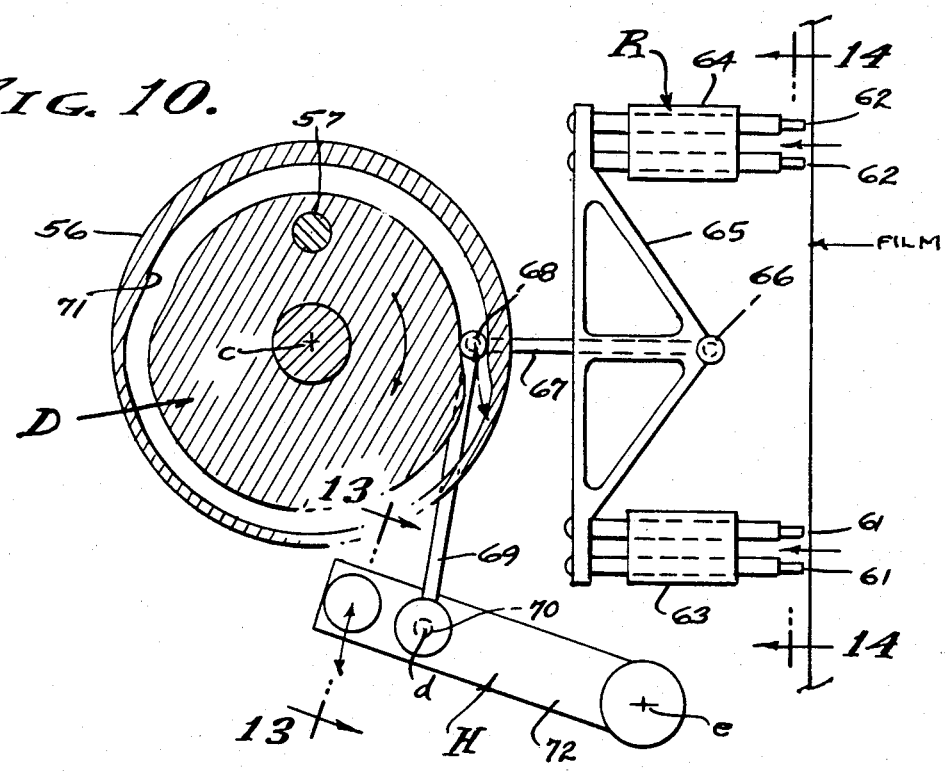
FIG. 10 is a plan section taken as indicated by line 10—10 in FIG. 4.
Figure 11:
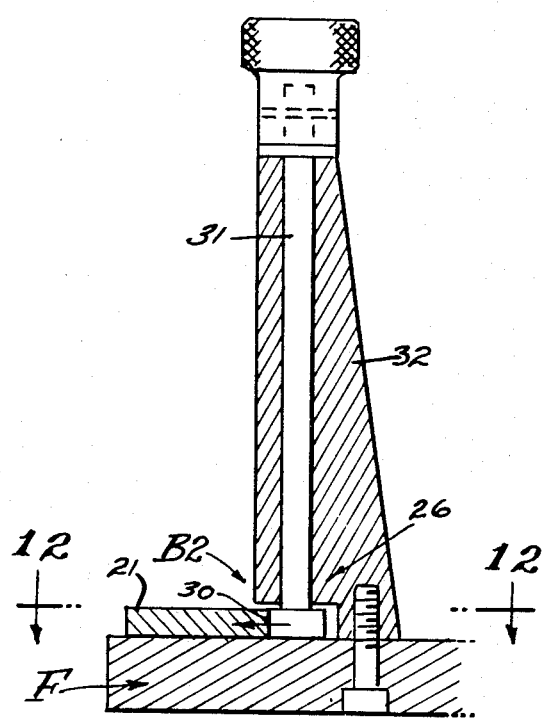
FIG. 11 is a fragmentary sectional view taken as indicated by line 11—11 on FIG. 1.
Figure 12:
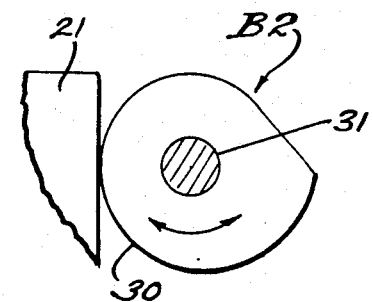
FIG. 12 is an enlarged detailed sectional view taken as indicated by line 12—12 in FIG. 11.

In accordance with this invention, the transport means A is comprised of spaced upper and lower transport arms 14 between which there is the transmission means T rotated by a laterally offset drive means D. The transport arms 14 pivot on the axis a which is shiftable with the pitch adjustment means B2, the arms 14 being alike or identical. Each arm 14 is carried by a tubular hub 15 in which there is an anti friction sleeve 16, 16' the arm and its hub forming an integral "L" shaped member. As shown in FIG. 3, they are related to that the lower arm is engaged over a tubular pivot post 17 with its hub projecting upwardly and its anti friction sleeve 16 free to turn on said post, and so that the upper arm overlies the lower arm with its hub projecting downwardly and with opposed ends 18 of the two hubs 15 frictionally engaged. In practice there is a positioning shim between the opposed ends 18 of the hubs 15.

Referring now to the alignment means B1, the post 17 that provides the pivot axis a for lower arm 14 is integral with an adjustment arm 21 of means B2 later described, while the hub 15 of upper arm 14 is engaged over a tubular pivot 19 which is essentially a continuation of post 17 and free to turn on an anti friction sleeve 16' within the hub. As will be seen, the axes of the two arms 14 may be adjusted so as to be eccentric, as circumstances require. The opposed ends 20 of the pivot post 17 and pivot 19 abutt with frictional engagement, the hub 15 of the lower arm being supported by the adjustment arm 21, and the hub 15 of the upper arm being retained by a flange 22 of the tubular pivot 19. The purpose of these separated pivots is to permit alignment (eccentric is necessary) of the two widely spaced arms 14, which may be imperfect or distorted in some way, and all of which is set by a clamp tube 23 that has a manually rotatable flange 24 engageable with flange 22 to clamp the abutted ends of hubs 15 into positioned engagement relative to each other. The clamp tube 23 is threadedly engaged in the post 17 and its interior accommodates the lock means L with freedom for proximity adjustment. The clamp tube 23 of alignment means B1 is tightened when the upper and lower arms 14 are accurately aligned one with the other and with respect to the perforations at the opposite side margins of the film.

The pitch adjustment means B2 involves the arm 21 which carries the tubular pivot post 17, the arm 21 being slideably carried upon the base F in parallel relation to the film guideway of means G. Means B2 adjusts the position of axis a relative to the transverse movement of the film transported over or along the register plate 11. Accordingly, there is a transverse adjustment means 25 and a proximity adjustment means 26 for optimum placement of the adjustment arm 21. The transverse adjustment means 25 comprises a shiftable mounting pivot for the arm 21, shiftable transversely of base F in parallel relation to the aperture section of the register plate 11 and film guideway of means G. The adjustment means 25 includes a transverse slot in the frame F, in which there is a sliding nut 27 to receive a screw fastener that secures a shouldered bearing 28. The proximity adjustment means 26 comprises a cam 30 on a shaft 31 rotatable in a vertically disposed bracket 32 supported by base F, the cam being engageable with the forward side of adjustment arm 21 to position it with respect to the register plate 11, thereby locating the axis a of the pivot post 17 as may be required. Adjusted position of arm 21 is held by friction means 29, such as a spring washer secured by a fastener operating through an enlarged hole through the arm 21.

The lock means L is provided to secure the proximity adjustment means B2 and to locate the pivot post 17 and pivot 19 secured by alignment means B1. As shown, the means B2 is comprised of a central anchor post 33 rigid with and standing with clearance within the accommodating tubular pivot post 17 and tubular pivot 19, and a clamp screw 34 with a manually rotatable head to bear against the top of flange 24. The clamp screw 34 is threadedly engaged into the post 33, and it locks the arm 21 and pivot post 17 in adjusted position with respect to the register plate 11.

Each transport arm 14 extends radially from its hub 15 for oscillatory movement over a cam 35 of the cam means C from which a crank pin 36 projects to oscillate the arm. As shown, there are upper and lower cams 35 in alignment with the slots 12 and 13 in the register plate 11, the upper arm 14 overlying the upper cam 35, and the lower arm overlying the lower cam 35. The said cams 35 are closely adjacent to the arms 14, and the said arms are of "open box" cross section, open at the inner side toward the cam 35, exposing a guide rod 37 along which a slide 38 operates. The slide 38 is rotatably engaged with and driven by the crank pin 36 which is eccentric on crank shaft 39 that revolves clockwise in the forward mode (plan view) on an axis b parallel to and intermediate the axis a and the vertical plane of register plate 11. The crank pins project from the upper and lower cams 35 on a common axis, so that the motion imparted to the upper and lower transport arms is identical.

In accordance with this invention, a pair of retractile claw pins 40 are carried by both the upper and lower transport arms 14, for penetration by operation of cams 35 into aligned pairs of adjacent perforations at each side margin of the film. As shown, there is a claw pin guide 41 offset from the arm box section and in alignment with each slot 12 and 13 and its complementary cam 35. The pairs of claw pins 40 are integral with and project from the outer end of a retractile cage 43 slideably carried by the guide 41 for radial extension from the axis a. The cage 43 has at least one and preferably a pair of elongated chambers to position a pair of compression springs 44 seated against pins pressed through the guide 41 and cover 41' thereby enclosing the cage and springs. The two springs 44 are required so as to overcome the acceleration forces at high frame rates. The springs 44 engage the inner ends of the chambers to yieldingly urge the cage 43 and integral claw pins 40 to a retracted position as permitted by the cams 35. As shown, the cams are symmetrical with a concentric high lobe for claw pin extension during the film transport when the register pins are retracted as later described, and with a depression for spring retraction of the claw pins during film registration when the register pins are extended as later described. In practice, the film transport arms can be operated in a forward or reverse mode as required.

Referring now to the transmission means T, a housing 45 preferably of cylinder form, is mounted to the base F for the exposure of the upper and lower cams 35 adjacent to the inner sides of the transport arms 14 to drive the slides 37 with the crank pins 36. The housing 45 accommodates the crank shaft 39 that revolves on spaced upper and lower anti friction bearings 46 with a transmission drive therebetween in the form of gearing or the like. Preferably, the transmission drive is a flexible cog-belt 49 operating a toothed pulley 50, the belt extending from the offset drive means D later described. In order to permit oscillation of the lower transport, the same as the upper transport arm, the housing 45 is supported upon one or more legs 47 between which the lower arm 14 is free to move through the necessary arc. The housing 45 has a pair of notches through which the cog-belt operates from said drive means. It will be seen that the transmission means T and cam means C operate on the fixedly positioned axis b.

A feature of this invention is the offset drive means D operable on a fixed axis c spaced laterally from the axis b and substantially rearward of the register plate 11, centered with the aperture 10; and back-up plate in the camera version. As shown, the drive means D is comprised of a drive shaft 52 driven by motor means (not shown) and operating a drive pulley 53 of toothed form having the same pitch diameter and number of teeth as the aforesaid pulley 50. The drive belt 49 is taught between the two pulleys so as to eliminate back-lash and so that rotary motion at axes b and c are exactly timed. The drive shaft 52 is carried through housing 45 on base F by anti friction bearings 55, and it carries a register cam 56 between an uppermost bearing 55 and the toothed pulley 53. A crank pin 57 projects from the upper face of the pulley 53 to operate the counterbalance means E later described. It will be seen that the cams 35 and crank pins 36 of the transport means A operate in timed relation with the register cam 56 and crank pin 57 of the counterbalance means E.

The register means R is provided to arrest and accurately locate each successive film frame that is transported into position by the claw pins 40. As shown, register pins 61 and 62 are provided to penetrate the film perforations along the lower margin thereof outside the picture format. In accordance with this invention, there are two widely spaced pairs of register pins 61 and 62, one pair of pins 61 at the entry side of the aperture section of the register plate 11, and one pair 62 at the exit side of the aperture section of the register plate. In practice, the entry side pins 16 are full sized pins to fully occupy the perforations, while the exit side pins 62 are of reduced size, horizontally as shown longitudinally of the film, so as to allow for film stretch and/or shrinkage. Each pair of register pins 61 and 62 are spaced so as to engage and penetrate next adjacent perforations, and the two pairs of register pins 61 and 62 are spaced fifteen perforations apart so as to embrace the 2¾ inch length of the picture format. The registration pins are offset from the aperture opening 10 so as not to engage the same perforations twice in successive frames. The register pins 61 and 62 are on parallel axes disposed normal to the register plate 11, and they are slideable in guide brackets 63 and 64 fixed to the base F.

The register means R is driven by the register cam 56 carried on the drive shaft 52 centered behind the aperture 10. The register pins 61 and 62 are reciprocated together and in unison by a carriage 65 rigid with and extending between the two pairs of register pins, the carriage being disposed at or below the lower edge of the picture format. Accordingly, the space behind the aperture 10 can be cleared for light projection. As shown, the carriage is of truss configuration having a pivot 66 at its apex, said pivot carrying a drive link 67 having a follower 68 engaged in a controlling groove of cam 56. The drive link 67 is stabilized by a radius arm 69 extending from a pivot 70 on an axis d and also pivoted to the drive link on the axis of the follower 68, whereby radial displacement of the controlling groove 71 drives the register pins into and out of the film penetration positions. The controlling cam groove 71 and follower 68 provide a desmodromic function for positive penetration and withdrawal of the register pins 61 and 62.

The timed relationship of the crank pins and transport cams 35 to the register cam 56 is such that retraction of the register pins 61 and 62 occurs while the transport claw pins 42 are penetrating the film perforations to transport the same. Alternately, retraction of the claw pins 42 occurs while the register pins 61 and 62 are penetrating the film perforations for framing and picture exposure. The cams 35 and 56 as they are shown in the drawings provide these functions.

Figure 13:
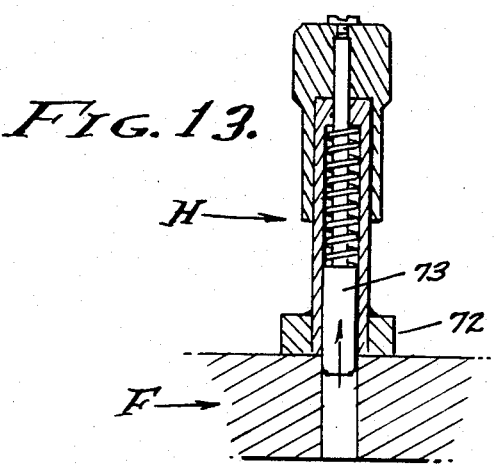
FIG. 13 is an enlarged detailed sectional view taken as indicated by line 13—13 in FIG. 10.

The register retraction means H is provided to withdraw the register pins from film penetration regardless of the rotative position of the cam 57. As shown, the pivot 70 and axis d is shiftable by means of a control link 72 to lengthen the distance between axis d and the controlling cam groove 71. The control link 72 is pivoted to base F on a fixed axis e, and is moved from an operative position shown by a manually releasable detent 73 (see FIG. 13). It will be seen that the centered carriage 65 and articulated linkage has an operational mode for alternate film registration and film transfer, and has an operational mode for complete register pin withdrawal and consequent film release for loading and unloading.

The counterbalance means E is provided to counteract the oscillatory motion of the transport arms 14 hereinabove described. In accordance with this invention, there are offset axes of rotation b and c with the driven crank shaft 39 and the drive shaft 52 operating in timed relation at the same angular velocity. Accordingly, the crank pins 36 and 57 are positioned by shafts 39 and 52 to move oppositely to and from each other as they revolve the crank pins 36 to oscillate the transport arms 14, and the crank pin 57 to oscillate a counterbalance arm 75 in opposition to said transport arms 14. As shown, the arm 75 is in a horizontal plane intermediate to the horizontal movement of the spaced upper and lower transport arms 14, and carried by a pivot post 76 closely adjacent to the register plate 11. The counterbalance arm 75 closely overlies the top face of the drive pulley 53, and is of downwardly "open box" cross section exposing a guide rod 77 along which a slide 78 operates. The slide 78 is rotatably engaged with the crank pin 57 revolving clockwise in the forward mode on axis c, and parallel to and spaced from the transmission axis b. Accordingly, the motion of counterbalance arm 75 is opposite to the motion of the transport arms 14 and counteracts the movement of mass thereof. A counter weight 79 is attached to the arm 75 as required.

From the foregoing it will be seen how this film transport and register movement is advantageously operated to transport and register wide and large format film, 65 mm and 70 mm film, used in the production and showing of motion pictues. Both transport and registration is accomplished without damage to the film, with accurate framing, and at all required film speeds. The movement features are accessible and easily removed for cleaning and service, and with the facility of transport arm alignment and pitch adjustment. The upper and lower arm feature is made possible by the location of the transmission therebetween and by the laterally extending cog-belt drive from the offset drive shaft that directly drives the register pins and counterbalance to counteract motion of the transport arms.

Having described only the typical preferred form and application of my invention, I do not wish to be limited or restricted to the specific details herein set forth, but wish to reserve to myself any modifications or variations that may appear to those skilled in the art as set forth within the limits of the following claims.

I claim:

1. A film transport and register movement for wide format film cameras and projectors, and including:
    a base with an upstanding register plate normal thereto and having a planar aperture section and a tangentially continuing arcuate transport section concentric about a first axis spaced rearward therefrom and normal to the base, there being an aperture plate overlying and complementary to the register plate and spaced therefrom forming a film guideway for film having opposite perforated margins,
    a pair of spaced transport arms pivoted on said first axis and each aligned with a perforated margin of the film and carrying at least one retractile claw pin for penetration of the film,
    a transmission means between the transport arms and on a second axis parallel to and intermediate the register plate and said first axis and comprising, a crank shaft rotatable on said second axis and having eccentric coaxial crank pins and each engageable with one of the spaced transport arms for oscillatory movement of said pair thereof, a pair of spaced cams and each closely adjacent to one of said pair of transport arms and each shaped to project the at least one claw pin for film penetration and transport during a first oscillatory movement of the transport arms and to permit retraction thereof during a second oscillatory movement thereof,
    a drive means on a third axis laterally offset from the second axis and coupled to the transmission means between the transport arms to oscillate the same,
    and register means comprising, at least one register pin for penetration of the film, and a cam driven by the drive means and shaped to project the register pin for film penetration and registration during said second oscillatory movement of the transport arm following said preceeding first transport oscillatory movement of the transport arm and transport of the film thereby.

2. The film transport and register movement as set forth in claim 1, wherein the transport arms are separate and individually positionable about said first axis, and including alignment means to align the pair of transport arms relative to each other and to the transport section of the register plate.

3. The film transport and register movement as set forth in claim 2, wherein the alignment means comprises a tubular pivot post rotatably carrying a lowermost transport arm and a tubular pivot rotatably carrying an uppermost transport arm, there being a clamp tube having clearance within the tubular pivot and threadedly engaged into the tubular pivot post and having a rotatable head for clamped engagement with said pivot tube with positioned abutted engagement on said pivot post.

4. The film transport and register movement as set forth in claim 1, including pitch adjustment means to locate said first axis transversely with respect to the aperture section of the register plate and in proximity to the transport section of the register plate.

5. The film transport and register movement as set forth in claim 4, wherein the pitch adjustment means comprises a shiftable adjustment arm carrying a pivot on said first axis, there being a transverse adjustment means for positioning the adjustment arm and there being a proximity adjustment means for positioning the adjustment arm.

6. The film transport and register movement as set forth in claim 4, wherein the pitch adjustment means comprises a pivoted adjustment arm carrying a pivot post, there being adjustable pivot means pivotally carrying the adjustment arm and positionable transversely and there being adjustable positioning means spacing the adjustment arm from the transport section of the register plate.

7. The film transport and register movement as set forth in claim 6, including lock means comprised of an anchor post rigid with and standing from the adjustment arm with clearance within the pivot post and threadedly receiving a clamp screw having a manually engageable head engaging a member against the anchor post.

8. The film transport and register movement as set forth in claim 2, wherein the alignment means comprises a tubular pivot post rotatably carrying a lowermost transport arm and a tubular pivot rotatably carrying an uppermost transport arm, there being a clamp tube having clearance within the tubular pivot and threadedly engaged into the tubular pivot post and having a rotatable head for clamped engagement with said pivot tube with positioned abutted engagement on said pivot post, wherein the pitch adjustment means comprises a pivoted adjustment arm carrying the tubular pivot post, there being adjustable pivot means pivotally carrying the adjustment arm and positionable transversely and there being adjustable positioning means spacing the adjustment arm from the transport section of the register plate, and including lock means comprised of an anchor post rigid with and standing from the adjustment arm with clearance within the tubular pivot post and threadedly receiving a clamp screw having a head engageable with the tubular pivot clamping it to the tubular pivot post.

9. The film transport and register movement as set forth in claim 1, wherein the transmission means is comprised of a housing disposed on said second axis extending between the transport arms and supported by the base and with bearings rotatably carrying the crank shaft with the crank pins and cams exposed to operate the spaced transport arms.

10. The film transport and register movement as set forth in claim 1, wherein the transmission means is comprised of a housing disposed on said second axis extending between upper and lower transport arms and supported by the base and with bearings rotatably carrying the crank shaft with a crank pin and cam exposed to the inside of both the upper and lower transport arms.

11. The film transport and register movement as set forth in claim 1, wherein the transmission means is comprised of a housing disposed on said second axis extending between the transport arms and supported from the base by legs embracing one of said transport arms and with bearings rotatably carrying the crank shaft with the crank pins and cams exposed to operated the spaced transport arms.

12. The film transport and register movement as set forth in claim 1, wherein the drive means on said third axis is coupled to the transmission means on said second axis in a plane intermediate movement planes of the spaced transport arm.

13. The film transport and register movement as set forth in claim 1, wherein the drive means on said third axis is disposed in spaced relation behind the aperture section of the register plate.

14. The film transport and register movement as set forth in claim 1, wherein the drive means on said third axis is disposed in spaced relation behind the aperture section of the register plate, and is in a plane intermediate movement planes of the spaced transport arms.

15. The film transport and register movement as set forth in claim 1, wherein the transmission means is comprised of a housing disposed on said second axis extending between the transport arms and supported by the base and with bearings rotatably carrying a drive pulley between movement planes of the spaced transport arms, and wherein the drive means is comprised of a drive shaft and pulley on said third axis and aligned with an coupled to the transmission pulley.

16. The film transport and register movement as set forth in claim 1, wherein the transmission means is comprised of a housing disposed on said second axis extending between the transport arms and supported by the base and with bearings rotatably carrying a toothed drive pulley between movement planes of the spaced transport arms, and wherein the drive means is comprised of a drive shaft and toothed pulley on said third axis and aligned with and coupled by a cog-belt to the toothed transmission pulley.

17. The film transport and register movement as set forth in claim 1, wherein at least one transport arm carries a pair of retractile claw pins spaced to penetrate next adjacent film perforations.

18. The film transport and register movement as set forth in claim 1, wherein the spaced transport arms each carries a pair of retractile claw pins spaced to penetrate next adjacent film perforations.

19. The film transport and register movement as set ofrth in claim 1, wherein the spaced transport arms each carries a pair of retractile claw pins spaced to tightly penetrate next adjacent film perforations.

20. The film transport and register movement as set forth in claim 1, wherein the register means comprises register pins aligned with perforations along a margin of the film and positioned to penetrate spaced perforations.

21. The film transport and register movement as set forth in claim 1, wherein the register means comprises pairs of register pins aligned with the perforations along a margin of the film and positioned to penetrate spaced pairs of adjacent perforations.

22. The film transport and register movement as set forth in claim 1, wherein the register means comprises register pins aligned with perforations along a margin of the film at spaced positions and penetrating a pair of adjacent perforations at least at one of said positions.

23. The film transport and register movement as set forth in claim 1, wherein the register means comprises a pair of register pins at the entry side of the picture format and a pair of register pins at the exit side of the picture format, said first mentioned pair of register pins fully occupying a paid of next adjacent perforations, and said second mentioned pair of register pins fully occupying the height of a pair of next adjacent perforations and of reduced width for longitudinal clearance therein.

24. The film transport and register movement as set forth in claim 1, wherein the drive means includes an eccentric crank pin operating in opposition to and at the same angular velocity as the transmission means crank shaft and pins, there being a counterbalance arm oscillated thereby in opposition to the motion of the pair of transport arms.

* * * * *